(12) United States Patent
Boe

(10) Patent No.: US 8,946,928 B2
(45) Date of Patent: Feb. 3, 2015

(54) POWER DISTRIBUTION SYSTEM AND METHOD THEREOF

(75) Inventor: Ove Boe, Tanem (NO)

(73) Assignee: Siemens Aktiengesellschaft, Munich (DE)

( * ) Notice: Subject to any disclaimer, the term of this patent is extended or adjusted under 35 U.S.C. 154(b) by 923 days.

(21) Appl. No.: 13/130,715

(22) PCT Filed: Nov. 9, 2009

(86) PCT No.: PCT/EP2009/064805
§ 371 (c)(1),
(2), (4) Date: May 25, 2011

(87) PCT Pub. No.: WO2010/060777
PCT Pub. Date: Jun. 3, 2010

(65) Prior Publication Data
US 2011/0254368 A1    Oct. 20, 2011

(30) Foreign Application Priority Data
Nov. 26, 2008  (EP) .................................. 08020580

(51) Int. Cl.
*H02J 1/10*    (2006.01)
*H02P 5/74*    (2006.01)
(Continued)

(52) U.S. Cl.
CPC *H02P 5/74* (2013.01); *B63H 21/17* (2013.01); *H02P 5/46* (2013.01); *H02P 9/107* (2013.01); *H02P 9/305* (2013.01); *H02P 9/307* (2013.01)
USPC ................ 307/18; 361/20; 361/93.1

(58) Field of Classification Search
CPC ................ H02J 3/38; H02J 1/10; H02J 1/12; H02J 1/102; H02J 3/36; H02J 1/08; H02J 3/382; H02J 3/00; H02J 9/061; Y02E 10/763; F03D 7/048; B63H 21/17; G06F 1/26; G06F 1/30
See application file for complete search history.

(56) References Cited

U.S. PATENT DOCUMENTS 4,376,968 A    3/1983   Wueschinski et al. .......... 363/37
5,351,775 A *  10/1994  Johnston et al. ............ 180/65.31
(Continued)

FOREIGN PATENT DOCUMENTS

| GB | 2444840 A | 6/2008 | ................ B63J 3/02 |
| JP | 11266532 A | 9/1999 | ............. B63H 21/17 |

(Continued)

OTHER PUBLICATIONS

International PCT Search Report and Written Opinion, PCT/EP2009/064805, 11 pages, Jun. 21, 2010.

*Primary Examiner* — Jared Fureman
*Assistant Examiner* — Terrence Willoughby
(74) *Attorney, Agent, or Firm* — King & Spalding L.L.P.

(57) ABSTRACT

The proposed system has a plurality of generator systems, each generator system having an alternating current generator directly connected to a rectifier. The alternating current generator is rotationally coupled to a prime mover, wherein, upon operation of the prime mover, the alternating current generator produces an alternating current output , is de-synchronized to further ones of the plurality of generator systems and has a variable generator speed. The rectifier directly connected the alternating current generator is adapted to convert the alternating current output of the alternating current generator into a direct current output. A direct current distribution bus is coupled to the direct current outputs from each of the rectifiers. The system further has a plurality of inverters adapted to receive power from the direct current distribution bus, the output of each inverter being adapted to drive an alternating current motor.

20 Claims, 4 Drawing Sheets

(51) Int. Cl.
  *B63H 21/17*  (2006.01)
  *H02P 5/46*  (2006.01)
  *H02P 9/10*  (2006.01)
  *H02P 9/30*  (2006.01)

(56) References Cited

U.S. PATENT DOCUMENTS

| | | | |
|---|---|---|---|
| 5,646,510 A | 7/1997 | Kumar | 322/16 |
| 6,177,738 B1 * | 1/2001 | Hentunen et al. | 307/67 |
| 6,501,628 B1 * | 12/2002 | Namba et al. | 361/5 |
| 7,812,555 B2 * | 10/2010 | Adra | 318/376 |
| 7,936,086 B2 * | 5/2011 | Yue et al. | 307/10.1 |
| 2005/0012339 A1 * | 1/2005 | Mikhail et al. | 290/44 |

FOREIGN PATENT DOCUMENTS

| | | | | |
|---|---|---|---|---|
| JP | 2008148376 A | 6/2008 | | H02P 3/00 |
| RU | 2219650 C2 | 12/2003 | | H02H 7/08 |
| RU | 75793 U1 | 8/2008 | | H02J 3/00 |
| SU | 1246234 A1 | 7/1986 | | H02H 7/125 |
| WO | 2010/060777 A2 | 6/2010 | | B63H 21/17 |

* cited by examiner

POWER DISTRIBUTION SYSTEM AND METHOD THEREOF

CROSS-REFERENCE TO RELATED APPLICATIONS

This application is a U.S. National Stage Application of International Application No. PCT/EP2009/064805 filed Nov. 9, 2009, which designates the United States of America, and claims priority to EP Application No. 08020580.0 filed Nov. 26, 2008, the contents of which are hereby incorporated by reference in their entirety.

TECHNICAL FIELD

The present invention relates to power distribution systems, particularly those used in propulsion, and for drilling applications.

BACKGROUND

Power systems, such as those used in propulsion, have a fuel combustion driven prime mover, such as a diesel internal combustion engine, as the main source of power. In a traditional diesel engine, such as those used in marine propulsion, there is a direct connection between the engine and the motors that drive the propellers. One or two such engines are generally used, depending on the size of the vessel. The problem here is that these engines operate under constant rotational speed, irrespective of the speed of the vessel. Hence, with low speed, the energy consumption is high compared to the actual output, leading to high levels of $CO_2$ emission, high energy consumption and high maintenance costs. In addition, breakdown of one component may quite often lead to total engine damage.

The above problem is obviated in case of a diesel-electric propulsion system. Herein, one or two large main engines may be substituted by more and smaller diesel engines, each of them being connected to an electrical generator delivering the electricity to a main switch-board, which is an AC distribution bus (AC: alternating current), split into two by a disconnector or a bus tie. The main switch-board supplies power to multiple propeller motors via respective rectifiers and inverters. The advantage of such a system is the use of sufficient numbers of smaller diesel engines, i.e., the usage of all engines at all times is avoided. If the engine is working idle or the vessel is moving with reduced speed, its may be sufficient to connect only one generator, which in return may be operated on optimum capacity and efficiency. On the other hand, a higher power demand may call for high speed and running of all of the generators. This flexibility gives substantial energy-savings, at the same time securing optimal output effect.

However, such diesel electric power systems suffer from a few drawbacks. For example, the main switch-board, which is an AC distribution bus, is rated for high current levels and represents a high cost element. Also, for optimal operation, at least one generator on each bus must be in operation. This results in a considerable reduction in fuel consumption. In uncritical operations the operation with a closed bus tie is possible. In these cases only one generator may be operated at low load. However, in case of the need of higher capacity, another generator must be switched on to the main switch-board. To do so, a normal synchronizing procedure must be followed, which increases the start-up time of the generator sets. Furthermore, the selectivity between generators in case of failure is a difficulty in many applications.

SUMMARY

According to various embodiments, an improved power distribution system can be provided.

According to an embodiment, a power distribution system may comprise —a plurality of generator systems, each comprising: an alternating current generator rotationally coupled to a prime mover, wherein, upon operation of said prime mover, said alternating current generator produces an alternating current output, is de-synchronized to further ones of the plurality of generator systems and has a variable generator speed, and a rectifier directly connected to said alternating current generator and adapted to convert said alternating current output of said alternating current generator into a direct current output, - a direct current distribution bus coupled to the direct current outputs from each of the rectifiers, and —a plurality of inverters adapted to receive power from said direct current distribution bus, the output of each inverter being adapted to drive an alternating current motor.

According to a further embodiment, said rectifier in said generator system can be a thyristor rectifier. According to a further embodiment, said rectifier in said generator system can be a diode rectifier. According to a further embodiment, said rectifier in said generator system can be a controlled rectifier adapted for sensing direct current output, further wherein said rectifier is adapted to be blocked to disconnect said direct current distribution bus from said generator system in case of an overload or short circuit of said distribution bus. According to a further embodiment, said rectifier in said generator system can be adapted to isolate said generator from said direct current distribution bus in case of a failure of said generator. According to a further embodiment, each alternating current generator can be directly connected to multiple rectifiers, the direct current output of each of said multiple rectifiers being coupled to multiple direct current distribution buses, each of said multiple direct current distribution buses being adapted to supply power to one or more inverters, the output of each of said one or more inverters being adapted to drive an alternating current motor. According to a further embodiment, the system may further comprise one or more auxiliary power inverters electrically coupled to said direct current distribution bus, said one or more auxiliary power inverters being adapted to provide power to auxiliary power consumption units. According to a further embodiment, the system may further comprise means for feeding power to auxiliary power consumption units directly from the output of one or more alternating current generators.

According to another embodiment, a method for power distribution may comprise: coupling an alternating current generator to a prime mover, wherein, upon operation of said prime mover, said alternating current generator produces an alternating current output, is de-synchronized to further alternating current generators and has a variable generator speed, directly connecting a rectifier to said alternating current generator, said rectifier being adapted to convert said alternating current output of said alternating current generator into a direct current output, coupling the direct current outputs from each of the rectifiers to a direct current distribution bus, and connecting a plurality of inverters to the direct current distribution bus, the output of each inverter being adapted to drive an alternating current motor.

According to a further embodiment of the method, the method may further comprise controlling an output load of said generator connected to said rectifier by controlling an output voltage of that generator. According to a further embodiment of the method, the method may comprise reducing an output frequency of said generator in response to a reduction in load of that generator. According to a further embodiment of the method, the method may comprise starting up said generators asynchronously.

BRIEF DESCRIPTION OF THE DRAWINGS

The present invention is further described hereinafter with reference to illustrated embodiments shown in the accompanying drawings, in which.

DETAILED DESCRIPTION

According to various embodiments, a power distribution system, comprises:
  a plurality of generator systems, each comprising:
    an alternating current generator rotationally coupled to a prime mover, wherein, upon operation of said prime mover, said alternating current generator produces an alternating current output, and
    a rectifier directly connected to said alternating current generator and adapted to convert said alternating current output of said alternating current generator into a direct current output,
  a direct current distribution bus coupled to the direct current outputs from each of the rectifiers, and
  a plurality of inverters adapted to receive power from said direct current distribution bus, the output of each inverter being adapted to drive an alternating current motor.

According to other embodiments, a method for power distribution, comprises:
  coupling an alternating current generator to a prime mover, wherein, upon operation of said prime mover, said alternating current generator produces an alternating current output,
  directly connecting a rectifier to said alternating current generator, said rectifier being adapted to convert said alternating current output of said alternating current generator into a direct current output,
  coupling the direct current outputs from each of the rectifiers to a direct current distribution bus, and
  connecting a plurality of inverters to the direct current distribution bus, the output of each inverter being adapted to drive an alternating current motor.

The underlying idea of various embodiments is to connect one or more rectifiers directly to each generator. Thus the rectifiers are considered a part of the generator system. This arrangement obviates the need for an AC main switch-board, which, as mentioned earlier, is a high cost element. Instead, various embodiments use a DC distribution bus (DC: direct current) which will be a part of the converter system anyway. Further, since the rectifier is directly connected to the generator, no synchronization in startup is needed and a fast connection of additional generators is possible in case of higher power requirement. As the output from each generator system is a DC current, the need for a fixed frequency output on the internal AC output of the generator is surplus. Hence at low load conditions, the speed (revolutions per minute) of the prime mover may be reduced in order to save fuel cost.

In one embodiment, said rectifier in said generator system is a diode rectifier. In an alternate embodiment, said rectifier in said generator system is a thyristor rectifier. The thyristor rectifier ensures soft starter function as it charges the DC distribution bus in a controlled manner avoiding high current peaks during start-up. The thyristor rectifier is additionally advantageous in over-current monitoring, disconnection of the generator in case of failure and disconnection of the load in case of failure or short circuit.

In one embodiment, said rectifier in said generator system is a controlled rectifier adapted for sensing direct current output, further wherein said rectifier is adapted to be blocked to disconnect said direct current distribution bus from said generator system in case of an overload or short circuit of said distribution bus. In a further embodiment, said rectifier in said generator system is adapted to isolate said generator from said direct current distribution bus in case of a failure of said generator. The above embodiments provide a secure power distribution system with increased reliability.

In a still further embodiment, each alternating current generator is directly connected to multiple rectifiers, the direct current output of each of said multiple rectifiers being coupled to multiple direct current distribution buses, each of said multiple direct current distribution buses being electrically coupled to one or more inverters, the output of each of said one or more inverters being adapted to drive an alternating current motor. This embodiment allows a flexible connection of each generator onto each DC distribution bus. In principle one rectifier for each necessary bus system may be connected to each generator, allowing a full flexibility between generators and DC distribution buses.

In one implementation, the proposed system further comprises one or more auxiliary power inverters electrically coupled to said direct current distribution bus, said one or more auxiliary power inverters being adapted to provide power to auxiliary power consumption units. In an alternative embodiment, the proposed system further comprises means for feeding power to auxiliary power consumption units directly from the output of one or more alternating current generators.

In accordance with one mode of operation, the output load of said generator connected to said rectifier is controlled by controlling an output voltage of that generator. In this mode, the only generator failure critical to the system is over-voltage. However, this may easily be controlled by switching off the excitation voltage.

A further operational mode includes reducing the output frequency of said generator in response to a reduction in load of that generator. This leads to reduced fuel cost and reduced emissions because the generator may be operated at the most economical speed.

In an exemplary operational mode, said generators are started up asynchronously. This reduces start-up time of the generators as no synchronization is needed. This also makes it possible for fast connection of additional generators to the system in case of an increased load requirement.

Various embodiments provide a novel solution to connect one or more rectifiers directly to each generator. Thus the rectifiers are considered to be a part of the generator system. As mentioned above, this arrangement reduces cost by eliminating the need for an AC main switch-board rated for high current levels. Instead, various embodiments use a DC distribution bus which may be needed as a part of the converter system anyway. Further advantages of various embodiments will be discussed in connection with the various embodiments illustrated hereinafter. Embodiments of the power distribution system described hereinafter may be implemented in various applications, such as in propulsion systems or drilling systems, among others.

Figure 1:
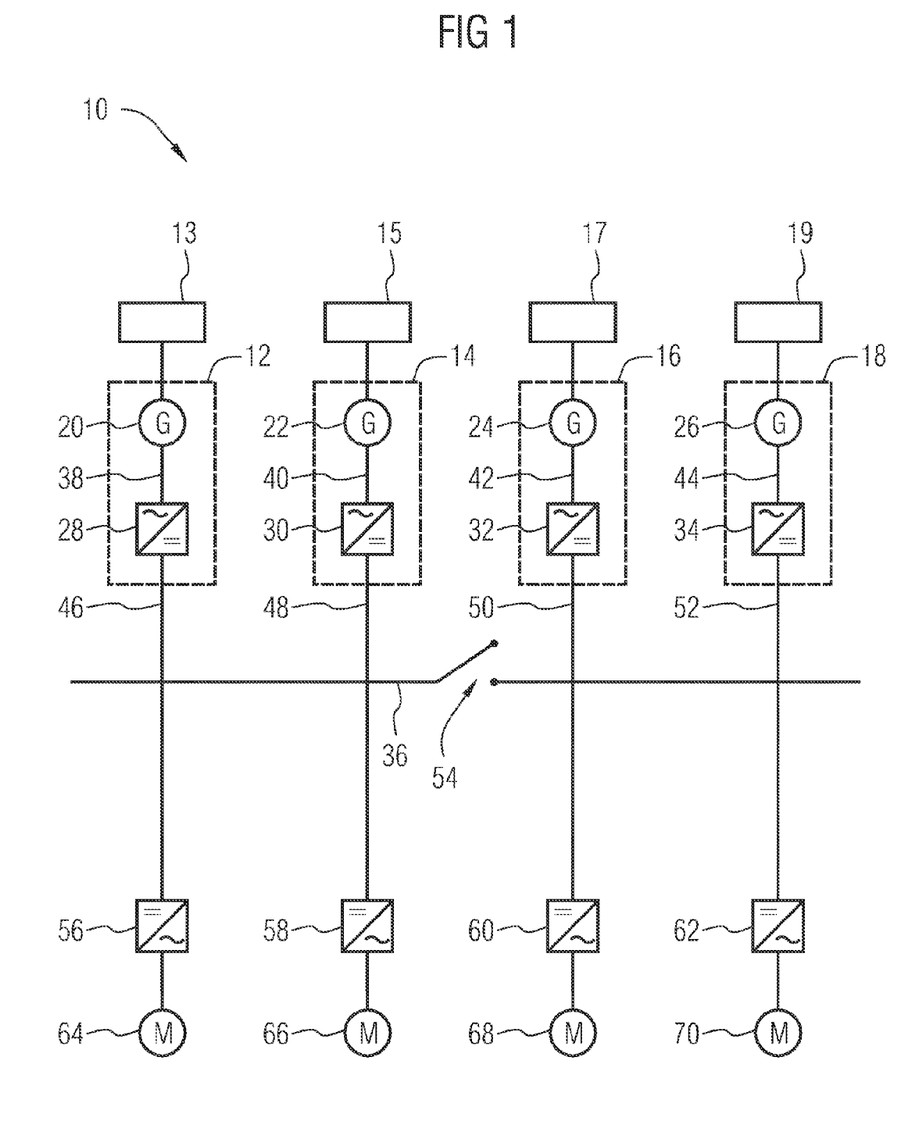
FIG. 1 is a schematic diagram of a power distribution system according to one embodiment.

Referring to FIG. 1, a power distribution system 10 includes a number of prime mover units 13, 15, 17 and 19. In the illustrated embodiment, the prime movers 13, 15, 17 and 19 comprise diesel engines. However, the prime movers may alternatively comprise any other kind of internal combustion engines, gas turbines, or micro-turbines, among others. The diesel engines 13, 15, 17 and 19 are rotationally coupled to AC generators 20, 22, 24 and 26 respectively. Under operation of one or more of the diesel engines 13, 15, 17 and 19, the respective generators 20, 22, 24 and 26 produce AC outputs 38, 40, 42 and 44 respectively. In accordance with various embodiments, each of the generators 20, 22, 24 and 26 is directly connected to a respective rectifier 28, 30, 32 and 34, the generators and rectifier together forming a part of the generator systems 12, 14, 16 and 18 respectively. The rectifiers 28, 30, 32 and 34 convert the AC outputs of the generators 20, 22, 24 and 26 to DC outputs 46, 48, 50 and 52 respectively. The DC outputs 46, 48, 50 and 52 of the rectifiers 28, 30, 32 and 34 are delivered to a DC distribution bus 36, which replaces the AC switch-board that are currently used in state of the art implementations. The DC distribution bus may be split into two by a disconnector or a bus tie 54. From the DC distribution bus 36, power is supplied to one or more AC motors 64, 66, 68, 70 (independent of the number of generators) via inverters 56, 58, 60, 62 respectively. In case of a propulsion system, these motors may be directly coupled to the propellers, azimuth thrusters, etc. The number of generator systems operational at any point of time is dependent on the power requirement. For example, under low load, only one generator system may be operational. Additional generator systems may be energized in case of higher power requirement.

Thus, as can be seen, by connecting one or more rectifiers directly to each generator, the need for an AC main switchboard is obviated. In an embodiment, the rectifiers 28, 30, 32, 34 are thyristor rectifiers, although diode rectifiers may also be used. Using a thyristor rectifier in the generator system is advantageous in a number of ways. First, using a thyristor rectifier provides soft starter function wherein, during start-up of a generator unit, the DC distribution bus 36 is charged in a controlled manner avoiding high current peaks during start-up. The thyristor rectifier connected to the generator also facilitates over-current monitoring by monitoring the output current (DC) of the thyristor rectifier. In case a short circuit current exceeds a threshold set point level, the trigger pulses will be temporarily be blocked causing the overload current to seize after approximately 10 milliseconds. Thereafter the thyristor rectifier would perform a new soft start allowing a preset maximum overload current to flow for a preset time prior to a permanent shutdown. During this time, further failure clearance of the system may follow.

Further, the proposed use of a thyristor rectifier directly connected to the generator also provides faster generator start-up. This is because as the output from the generator system is a direct current, no synchronization of phase angle is required during start-up of additional generators. Thus, in case of a generator failure or a sudden increase in power demand, an additional generator may be easily started by starting a diesel engine, energizing the respective generator and releasing the thyristor rectifier. As soon as the generator starts producing an output voltage high enough it would start feeding the load without any further synchronization. Thus start-up time is considerably reduced compared to traditional operation.

Using a thyristor rectifier in the generator systems also ensures increased reliability of the power system. For example, the thyristor rectifier prevents return power into the generators. Furthermore, the thyristor rectifier provides disconnection of the generator in case of failure and disconnection of the load in case of failure or short circuit. The proposed arrangement obviates the need for circuit breakers. Also, the use of a thyristor bridge provides easy detection and disconnection of defective components.

The proposed system provides parallel operation and load sharing between the generators by adjusting the output voltage setpoint. A droop control of the voltage can also be installed securing the independence of each generator in case of overall voltage control failure. These features will be dependent on the overall system layout and requirements. In parallel operation, the engines may be operated each at the most economical speed. The output frequency of the generator is not important. The load on each generator in parallel operation is controlled by the output voltage. The only generator failure critical to the system is over-voltage. However, this may easily be controlled by switching off the excitation voltage. Another advantage of the proposed system is that constant speed and hence constant frequency of the generators are not necessary. In low load operations, the speed of the engines may be reduced below normal. This will reduce the fuel consumption and hence the emissions further.

Figure 2:
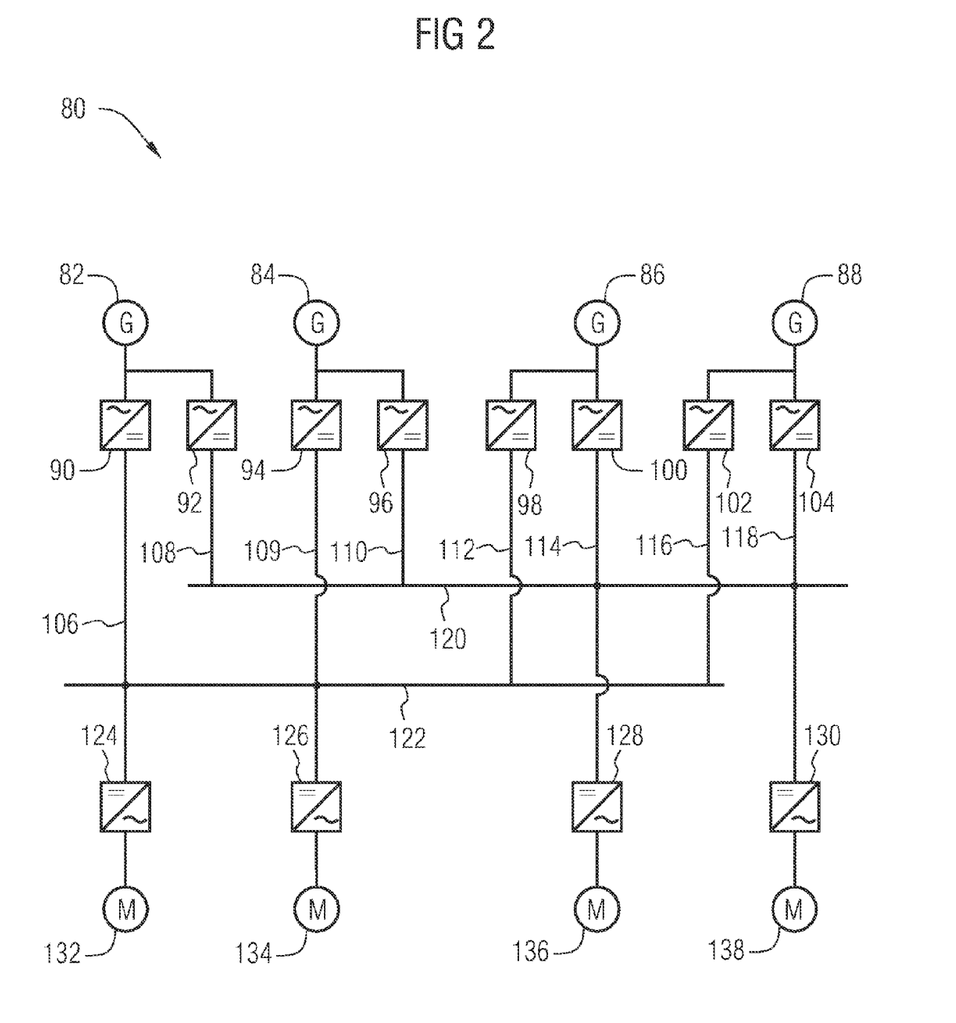
FIG. 2 is a schematic diagram of a multiple bus power distribution system having dual rectifiers connected to each generator.

Other embodiments may also be extended to multi-bus systems wherein each generator system has multiple rectifiers, each rectifier delivering a DC output to one of a plurality of DC distribution buses. Referring to FIG. 2, a power distribution system 80 is illustrated having multiple generators 82, 84, 86, 88, each generator being connected to dual rectifiers, preferably thyristor rectifiers. It is to be understood that each generator is rationally coupled to a prime mover (not shown). The system 80 also comprises two DC distribution buses 120 and 122. As shown, the generator 82 is connected to rectifiers 90 and 92, wherein the output 106 of the rectifier 90 is delivered to the DC distribution bus 122, while the output 108 of the rectifier 92 is delivered to the Dc distribution bus 120. Likewise, the output 109 of the rectifier 94, the output 112 of the rectifier 98 and the output 116 of the rectifier 102 are delivered to the DC distribution bus 122, while the output 110 of the rectifier 96, the output 114 of the rectifier 100 and the output 118 of the rectifier 104 are delivered to the DC distribution bus 120. The DC distribution bus 122 supplies power to motors 132 and 134 via inverters 124 and 126. The DC distribution bus 120 supplies power to motors 136 and 138 via inverters 128 and 130. The proposed multi-bus system provides enhanced security and allows a flexible connection of each generator onto each DC distribution bus. In principle one rectifier for each necessary bus system may be connected to each generator, allowing a full flexibility between generators and DC distribution buses. In the above illustrated embodiment, the DC distribution buses are not connected by bus ties with each other, allowing better isolation of the bus systems. In case of a double or a multiple bus system, if there is a generator failure or a sudden increase in power demand, the rectifier from one or more generators feeding another bus may be released causing the generator(s) to feed the bus in need of more power.

Figure 3:
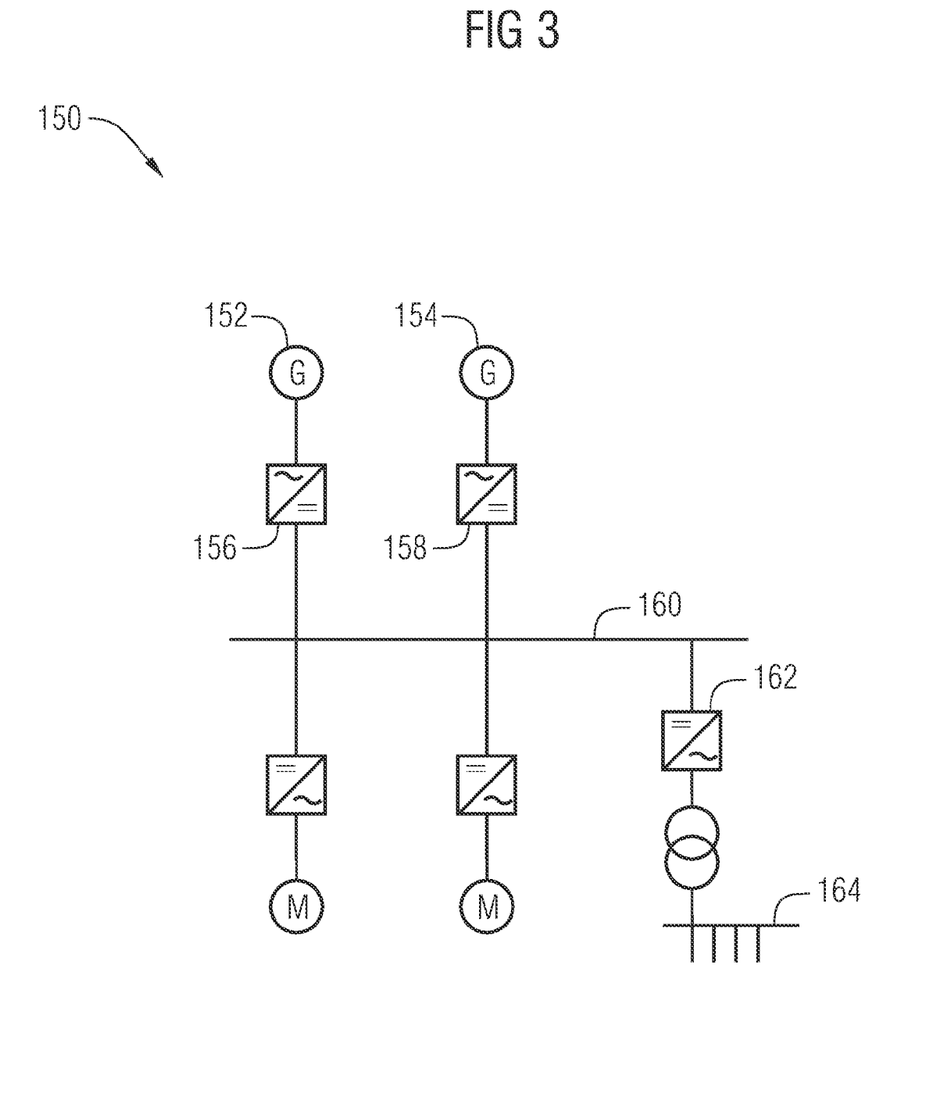
FIG. 3 is a schematic diagram of a power distribution system having auxiliary power inverters connected to the DC bus.
Figure 4:
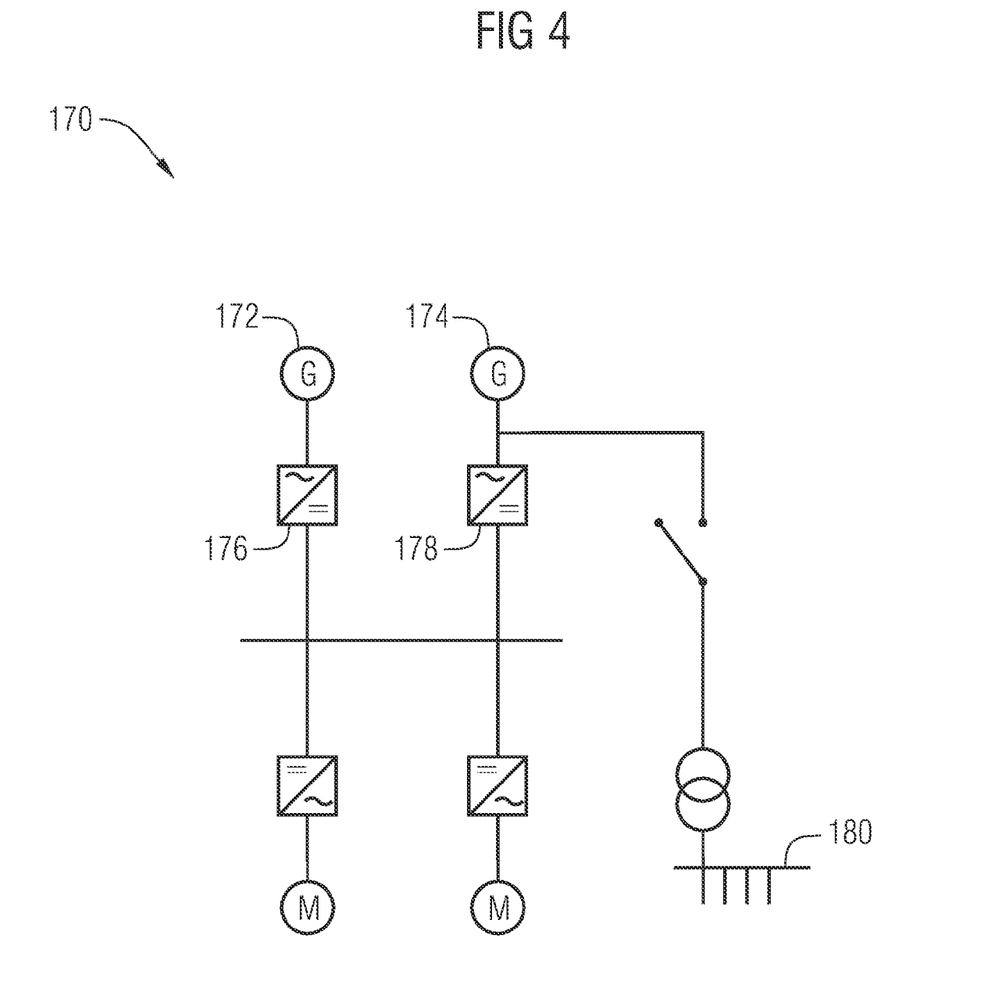
FIG. 4 is a schematic diagram of a power distribution system wherein power is fed to auxiliary power consumption units directly from the output of the generators.

FIG. 3 and FIG. 4 illustrate embodiments for providing power supply to auxiliary power consumption units in accordance with the proposed technique. In FIG. 3, a power system 150 comprises generators 152 and 154 (prime movers not shown) connected respectively to rectifiers 156 and 158 delivering DC power to a DC distribution bus 160. Auxiliary power consumption units 164 receive power from one or more auxiliary inverters 162 connected to the DC distribution bus 160. Alternatively, auxiliary power may be received directly from one or more generators. As shown in FIG. 4, the power system 170 comprises generators 172 and 174 connected to rectifiers 176 and 178 respectively. Herein, as shown, power is fed to the auxiliary power consumption units 180 directly from the generator 174. However, in this case, it is necessary to operate the generator 174 at a fixed speed.

A third alternative is to have a dedicated generator to feed power to the auxiliary power consumption units. The use of filters may be advantageous at least for the first two embodiments.

Summarizing, various embodiments deal with a system and method for power distribution. The proposed system comprises a plurality of generator systems, each generator system comprising an alternating current generator directly connected to a rectifier. The alternating current generator is rotationally coupled to a prime mover, wherein, upon operation of said prime mover, said alternating current generator produces an alternating current output. The rectifier directly connected the alternating current generator is adapted to convert said alternating current output of said alternating current generator into a direct current output. A direct current distribution bus is coupled to the direct current outputs from each of the rectifiers. The system further comprises a plurality of inverters adapted to receive power from said direct current distribution bus, the output of each inverter being adapted to drive an alternating current motor.

Although the invention has been described with reference to specific embodiments, this description is not meant to be construed in a limiting sense. Various modifications of the disclosed embodiments, as well as alternate embodiments, will become apparent to persons skilled in the art upon reference to the description of the invention. It is therefore contemplated that such modifications can be made without departing from the spirit or scope of the present invention as defined.

The invention claimed is:

1. A power distribution system comprising:
    a plurality of generator systems, each comprising:
        an alternating current generator rotationally coupled to a prime mover, wherein said alternating current generator produces an alternating current output upon operation of said prime mover and has a variable generator speed, and
        a rectifier directly connected to said alternating current generator and configured to convert said alternating current output of said alternating current generator into a direct current output,
    a direct current distribution bus coupled to the direct current outputs from each of the rectifiers, and
    a plurality of inverters configured to receive power from said direct current distribution bus, wherein the output of each inverter is configured to drive an alternating current motor,
    wherein the rectifier of at least one of the generator systems is configured to isolate the alternating current generator of that generator system from said direct current distribution bus in response to a failure of that alternating current generator.

2. The system according to claim 1, wherein said rectifier of at least one of said plurality of generator systems is a thyristor rectifier.

3. The system according to claim 1, wherein said rectifier of at least one of said plurality of generator systems is a diode rectifier.

4. The system according to claim 1, wherein, for at least one of said plurality of generator systems, said rectifier is a controlled rectifier configured to sense direct current output, and wherein said rectifier is configured to be blocked to disconnect said direct current distribution bus from the respective generator system in the event of an overload or short circuit of said distribution bus.

5. The system according to claim 1, wherein each alternating current generator is directly connected to multiple rectifiers, the direct current output of each of said multiple rectifiers being coupled to multiple direct current distribution buses, each of said multiple direct current distribution buses configured to supply power to one or more inverters, the output of each of said one or more inverters configured to drive an alternating current motor.

6. The system according to claim 1, further comprising one or more auxiliary power inverters electrically coupled to said direct current distribution bus, said one or more auxiliary power inverters configured to provide power to auxiliary power consumption units.

7. The system according to claim 1, further comprising means for feeding power to auxiliary power consumption units directly from the output of one or more alternating current generators.

8. A method for power distribution in a power distribution system comprising a plurality of alternating current generators, the method, comprising:
    coupling a particular one of the alternating current generators to a prime mover, wherein said particular alternating current generator produces an alternating current output upon operation of said prime mover and has a variable generator speed,
    directly connecting a rectifier to said particular alternating current generator, said rectifier configured to convert said alternating current output of said particular alternating current generator into a direct current output,
    coupling the direct current output from the rectifier to a direct current distribution bus, and
    connecting a plurality of inverters to the direct current distribution bus, wherein the output of each inverter is configured to drive an alternating current motor,
    wherein the rectifier is configured to isolate the particular alternating current generator from said direct current distribution bus in response to a failure of the particular alternating current generator.

9. The method according to claim 8, comprising controlling an output load of said particular alternatingcurrent generator connected to said rectifier by controlling an output voltage of said particular alternating current generator.

10. The method according to claim 8, comprising reducing an output frequency of said particular alternating current generator in response to a reduction in load of said particular alternating current generator.

11. The method according to claim 8, comprising starting up said plurality of alternating current generators, including the particular alternating current generator, asynchronously.

12. A method for distributing power comprising:
    providing a plurality of generator systems, including for each generator system:
        coupling an alternating current generator rotationally to a prime mover, wherein said alternating current generator produces an alternating current output upon operation of said prime mover and has a variable generator speed, and connecting a rectifier directly to said alternating current generator and configured to convert said alternating current output of said alternating current generator into a direct current output, coupling a direct current distribution bus to the direct current outputs from each of the rectifiers, and receiving power from said direct current distribution bus by a plurality of inverters, and driving an alternating current motor by the output of each inverter, wherein the rectifier of at least one of the generator systems is configured to isolate the alternating current generator of that generator system from said direct current distribution bus in response to a failure of that alternating current generator.

13. The method according to claim 12, wherein said rectifier of at least one of said plurality of generator systems is a thyristor rectifier.

14. The method according to claim 12, wherein said rectifier of at least one of said plurality of generator systems is a diode rectifier.

15. The method according to claim 12, further comprising, for at least one of said plurality of generator systems in which the respective rectifier is a controlled rectifier, sensing direct current output by said rectifier and blocking said rectifier to disconnect said direct current distribution bus from the respective generator system in the event of an overload or short circuit of said distribution bus.

16. The method according to claim 13, wherein each alternating current generator is directly connected to multiple rectifiers, the direct current output of each of said multiple rectifiers being coupled to multiple direct current distribution buses, the method further comprising supplying power by each of said multiple direct current distribution buses to one or more inverters, and driving an alternate current motor by the output of each of said one or more inverters.

17. The method according to claim 12, further comprising providing power to auxiliary power consumption units by one or more auxiliary power inverters electrically coupled to said direct current distribution bus.

18. The method according to claim 12, further comprising feeding power to one or more auxiliary power consumption units directly from the output of one or more alternating current generators.

19. A power distribution system comprising:
a direct current distribution bus, and
a plurality of generator systems, each comprising:
an alternating current generator rotationally coupled to a prime mover, wherein said alternating current generator produces an alternating current output upon operation of said prime mover and has a variable generator speed, and
a rectifier directly connected to said alternating current generator and configured to convert said alternating current output of said alternating current generator into a direct current output, which direct current output is coupled to said direct current distribution bus, and
a plurality of inverters configured to receive power from said direct current distribution bus, wherein the output of each inverter is configured to drive an alternating current motor,
wherein for at least one of said plurality of generator systems:
the respective rectifier is a controlled rectifier configured to sense direct current output, and
wherein the respective rectifier is configured to be blocked to disconnect the respective generator system from said direct current distribution bus in the event of an overload or a short circuit of said distribution bus.

20. A method for power distribution in a power distribution system comprising a plurality of alternating current generators, the method, comprising:
coupling a particular one of the alternating current generators to a prime mover, wherein said particular alternating current generator produces an alternating current output upon operation of said prime mover-and has a variable generator speed,
directly connecting a rectifier to said particular alternating current generator, said rectifier configured to convert said alternating current output of said particular alternating current generator into a direct current output,
coupling the direct current output from the rectifier to a direct current distribution bus, and
connecting a plurality of inverters to the direct current distribution bus, wherein the output of each inverter is configured to drive an alternating current motor,
sensing direct current output by said rectifier, and
blocking said rectifier to disconnect the particular alternating current generator from said direct current distribution bus in the event of an overload or a short circuit of said distribution bus.

* * * * *